(12) United States Patent
Boxey

(10) Patent No.: US 7,618,056 B2
(45) Date of Patent: Nov. 17, 2009

(54) INFLATABLE CURTAIN WITH INTEGRAL SHIELD

(75) Inventor: Kevin J. Boxey, Columbiaville, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 60 days.

(21) Appl. No.: 11/987,295

(22) Filed: Nov. 29, 2007

(65) Prior Publication Data

US 2008/0136143 A1    Jun. 12, 2008

Related U.S. Application Data

(63) Continuation-in-part of application No. 11/637,349, filed on Dec. 12, 2006, now abandoned.

(51) Int. Cl.
*B60R 21/20* (2006.01)
(52) U.S. Cl. .................................... 280/729
(58) Field of Classification Search ............... 280/729, 280/730.2, 740, 743.1
See application file for complete search history.

(56) References Cited

U.S. PATENT DOCUMENTS

| | | | | |
|---|---|---|---|---|
| 3,473,824 A | | 10/1969 | Carey et al. | |
| 3,586,347 A | * | 6/1971 | Carey et al. | 280/729 |
| 3,843,151 A | * | 10/1974 | Lewis | 280/736 |
| 3,900,210 A | * | 8/1975 | Lohr et al. | 280/729 |
| 4,006,918 A | | 2/1977 | MacFarland | |
| 4,360,223 A | * | 11/1982 | Kirchoff | 280/729 |
| 5,927,748 A | * | 7/1999 | O'Driscoll | 280/729 |
| 5,951,038 A | * | 9/1999 | Taguchi et al. | 280/729 |
| 6,102,435 A | * | 8/2000 | Wallner et al. | 280/730.2 |
| 7,445,238 B2 | * | 11/2008 | Marriott | 280/740 |
| 2004/0140657 A1 | * | 7/2004 | Kuppurathanam | 280/743.1 |
| 2007/0108743 A1 | * | 5/2007 | Muller | 280/729 |

OTHER PUBLICATIONS

Co-pending U.S. Appl. No. 11/386,488, filed Mar. 22, 2006 for Air Bag Module With a Shield.

* cited by examiner

*Primary Examiner*—Paul N Dickson
*Assistant Examiner*—Robert A Coker
(74) *Attorney, Agent, or Firm*—Tarolli, Sundheim, Covell & Tummino LLP

(57) ABSTRACT

An inflatable vehicle occupant protection device (14) includes a main portion (80) defining an inflatable volume (60) and a shield portion (100) defining a shield chamber (102). The inflatable volume (60) and shield chamber (102) are in fluid communication with each other. The shield portion (100) is turned inside-out, positioned in the inflatable volume (60), and configured to receive inflation fluid from an inflation fluid source (24). The shield portion (100) is further configured to rupture and release inflation fluid into the inflatable volume (60) of the main portion (100).

20 Claims, 8 Drawing Sheets

INFLATABLE CURTAIN WITH INTEGRAL SHIELD

RELATED APPLICATIONS

This application is a continuation-in-part of U.S. application Ser. No. 11/637,349, which was filed on Dec. 12, 2006 now abandoned.

FIELD OF THE INVENTION

The present invention relates to an apparatus for helping to protect an occupant of a vehicle. More particularly, the present invention relates to an inflatable vehicle occupant protection device with an integrally formed inflation fluid shield.

BACKGROUND OF THE INVENTION

It is known to inflate an inflatable vehicle occupant protection device to help protect a vehicle occupant. One particular type of inflatable vehicle occupant protection device is an inflatable curtain that inflates away from the roof of the vehicle in a downward direction and inside the passenger compartment between a vehicle occupant and the side structure of the vehicle. A known inflatable curtain is inflated from a deflated condition by inflation fluid directed from an inflator to the inflatable curtain.

SUMMARY OF THE INVENTION

The present invention relates to an inflatable vehicle occupant protection device. The protection device includes a main portion defining an inflatable volume and a shield portion defining a shield chamber. The inflatable volume and shield chamber are in fluid communication with each other. The shield portion is turned inside-out, positioned in the inflatable volume, and configured to receive inflation fluid from an inflation fluid source. The shield portion is further configured to rupture and release inflation fluid into the inflatable volume of the main portion.

The present invention also relates to an apparatus for helping to protect an occupant of a vehicle having a side structure and a roof. The apparatus includes an inflatable vehicle occupant protection device inflatable away from the vehicle roof between the side structure of the vehicle and a vehicle occupant. The protection device includes a main portion defining an inflatable volume and a shield portion defining a shield chamber. The inflatable volume and shield chamber are in fluid communication with each other. The shield portion is turned inside-out, positioned in the inflatable volume, and configured to receive inflation fluid from an inflation fluid source. The shield portion receives and helps absorb forces from the initial discharge of inflation fluid into the protection device.

The present invention further relates to a one piece woven inflatable vehicle occupant protection device. The protection device includes a main portion defining an inflatable volume, a shield portion defining a shield chamber, and a neck portion providing fluid communication between the inflatable volume and the shield chamber. The shield portion is turned inside-out through the neck portion and positioned in the inflatable volume. The shield portion is configured to receive inflation fluid from an inflation fluid source and to rupture and release inflation fluid into the inflatable volume of the main portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE PREFERRED EMBODIMENTS

Figure 1:
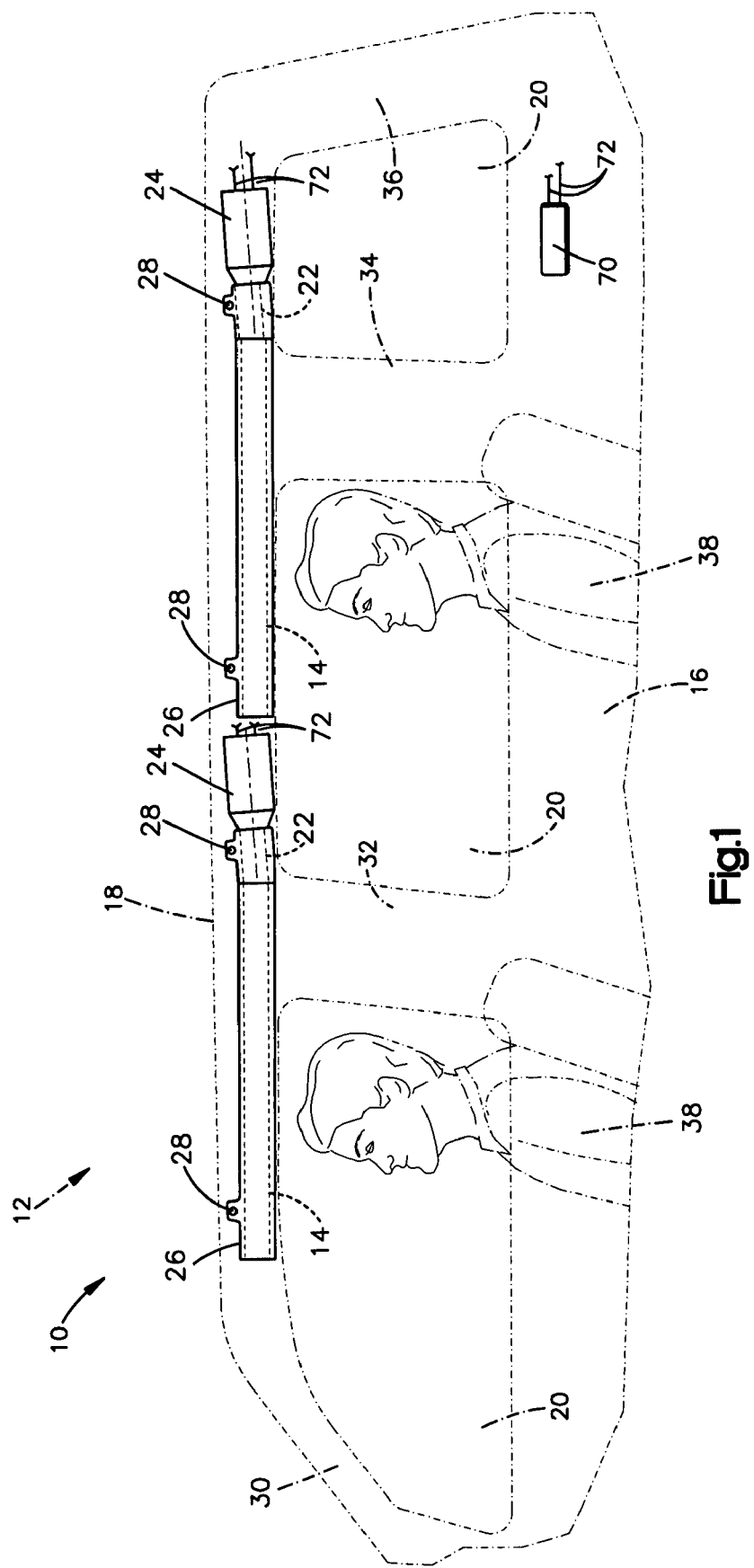
FIG. 1 is a schematic view of an apparatus for helping protect an occupant of a vehicle, illustrating the apparatus in a deflated condition.
Figure 2:
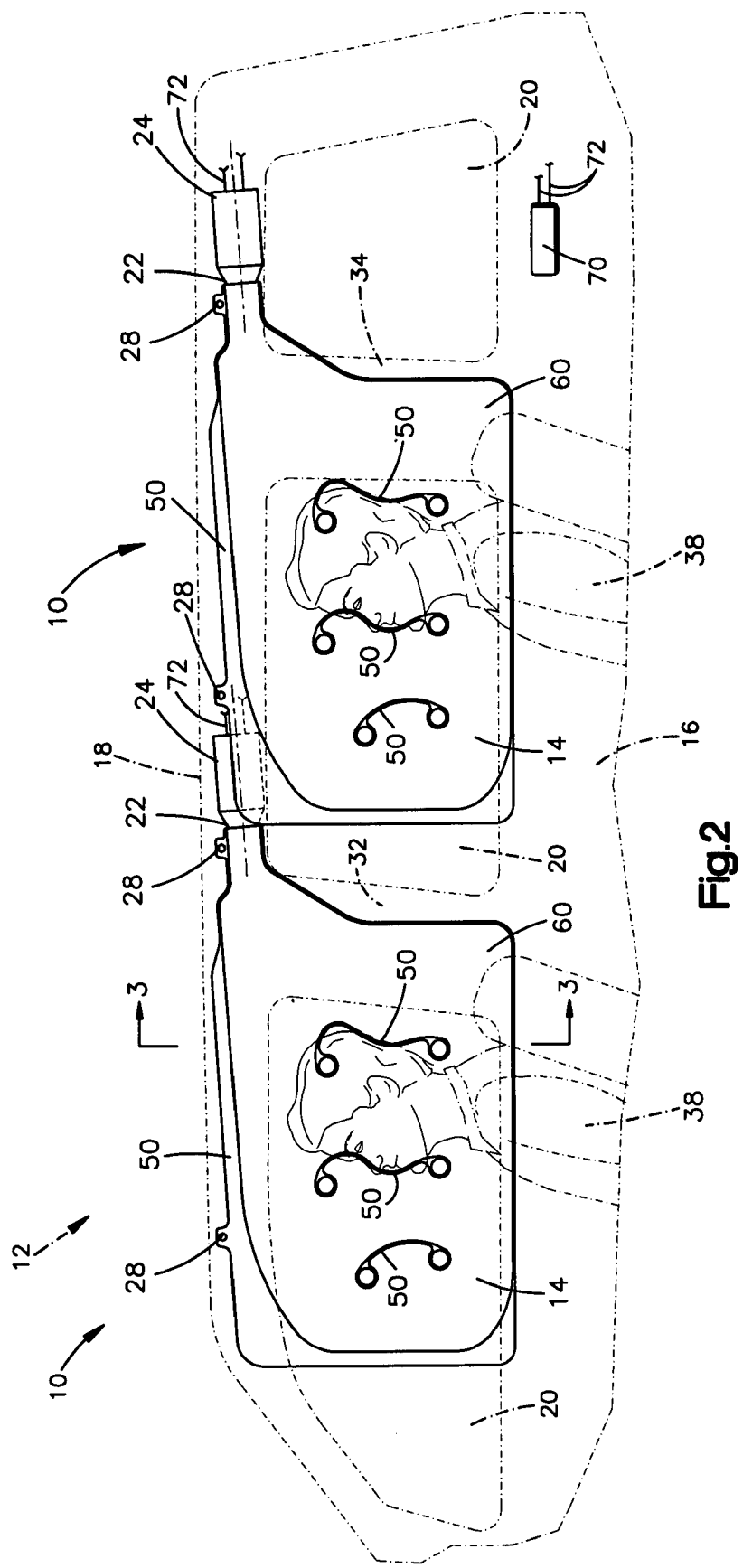
FIG. 2 is a schematic view of the apparatus of FIG. 1 in an inflated condition.

An apparatus 10 helps to protect one or more occupants 38 of a vehicle 12. As shown in FIGS. 1 and 2, the apparatus 10 includes an inflatable vehicle occupant protection device in the form of an inflatable curtain 14. The present invention may include an inflatable vehicle occupant protection device in an alternative form, such as a driver front impact air bag, passenger front impact air bag, side impact air bag, or inflatable knee bolster.

In the embodiment illustrated in FIGS. 1 and 2, the vehicle 12 is outfitted with two apparatus 10 and thus includes two inflatable curtains 14. The inflatable curtains 14 are mounted adjacent a side structure 16 of the vehicle 12 and a roof 18 of the vehicle. The side structure 16 of the vehicle 12 includes side windows 20, an A pillar 30, a B pillar 32, a C pillar 34, and a D pillar 36. In the illustrated embodiment, one inflatable curtain 14 extends between the A pillar 30 and B pillar 32 and thus helps protect a first row occupant 38. One inflatable curtain 14 extends between the B pillar 32 and C pillar 34 and thus helps protect a second row occupant 38. The configuration of the inflatable curtains 14, the vehicle 12, or both could, however, vary. For example, a single inflatable curtain (not shown) could extend from adjacent or near the A pillar 30 to adjacent or near the C pillar 34 to help protect the first and second row occupants 38.

The apparatus 10 includes an inflator 24 connected in fluid communication with the inflatable curtain 14 through a connection port 22 of the curtain. The inflator 24 contains a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a deflated condition. The deflated inflatable curtain 14 and the housing 26 have an elongated configuration and extend along the vehicle roof 18 and along the side structure 16 of the vehicle 12 above the side windows 20. The inflatable curtain 14 and housing 26 are connected to the vehicle 12 by means 28, such as fasteners.

Figure 3:
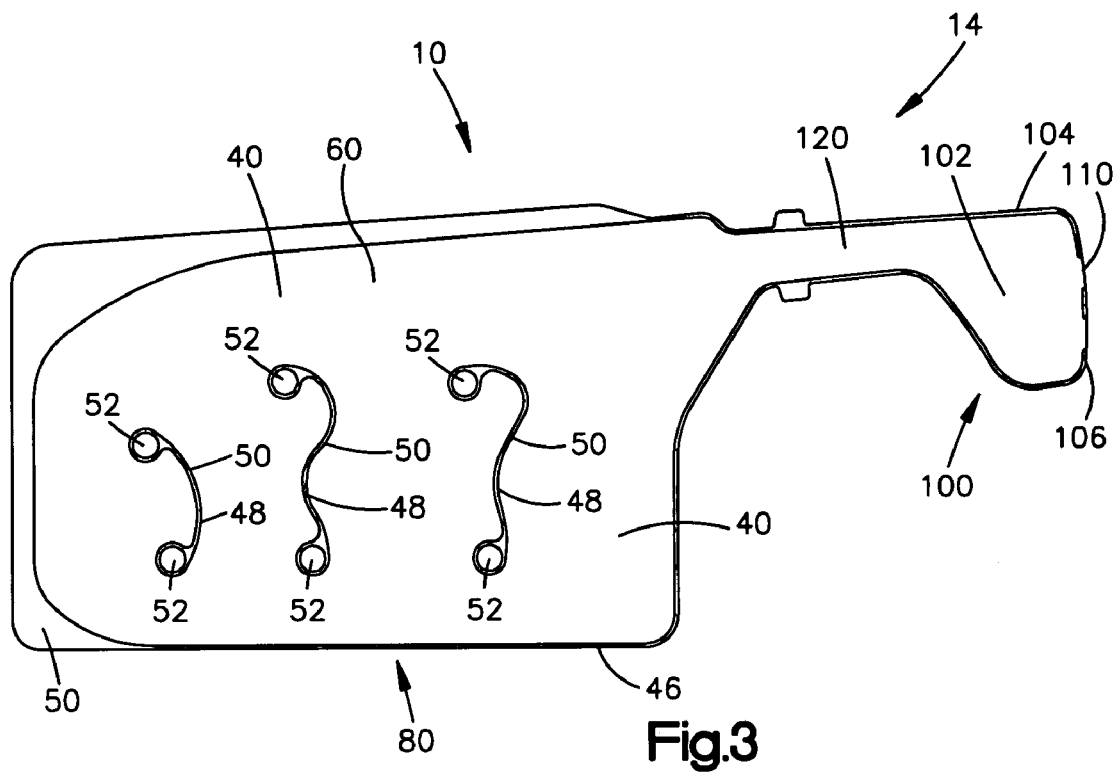
FIG. 3 is a plan view illustrating a portion of the apparatus of FIG. 1 in a pre-assembled condition.

In the embodiment of FIGS. 1-6, the inflatable curtain 14 has a one piece woven (OPW) construction. This construction may be achieved using known weaving processes on known weaving machines, such as a Jacquard loom. Referring to FIG. 3, the OPW inflatable curtain 14 comprises (a) overlying panels 40 woven as separate layers of material and (b) single layers of material 50 that define the periphery of the overlying panels. The single layers 50 include a single layer 46 that extends along at least a portion of an outer edge of the inflatable curtain 14. The single layers 50 may also include single layers 48 spaced from the outer edge of the inflatable curtain 14.

The single layers 50 help define an inflatable volume 60 of the inflatable curtains 14. The single layers 50 may also help define inflatable chambers within the inflatable volume 60. The single layers 48 may also form non-inflatable portions of the inflatable curtain 14 positioned within the inflatable volume 60. For example, in the embodiment illustrated in FIG. 3, the single layers 48 help define non-inflatable portions 52 of the inflatable curtain 14.

The inflatable curtain 14 may be woven from any desired material, such as nylon yarn. The inflatable curtain 14 may be uncoated, coated with a material, such as a gas impermeable urethane, or laminated with a material, such as a gas impermeable film. The inflatable curtain 14 thus may have a gastight or substantially gas-tight construction. Those skilled in the art will appreciate that alternative materials, such as silicone, may also be used to coat or laminate the inflatable curtain 14.

The vehicle 12 includes a sensor (shown schematically at 70 in FIGS. 1 and 2) for sensing the occurrence of an event for which inflation of the inflatable curtain 14 is desired, such as a side impact, a vehicle rollover, or both. Upon sensing such an event, the sensor 70 provides an electrical signal over lead wires 72 to the inflator 24. The electrical signal causes the inflator 24 to be actuated in a known manner. The inflator 24 discharges fluid under pressure through the connection port 22, which directs the fluid into the inflatable curtain 14.

The inflatable curtain 14 inflates under the pressure of the inflation fluid from the inflator 24. The housing 26 (FIG. 1) opens, and the inflatable curtain 14 inflates away from the roof 18 in a downward direction as shown in the drawings and in a downward direction with respect to the direction of forward vehicle travel into the position illustrated in FIGS. 2 and 3. The inflatable curtain 14, when inflated, is positioned between the side structure 16 of the vehicle 12 and the occupants 38 of the vehicle. The inflatable curtain 14, when inflated, helps absorb the energy of impacts and helps distribute the impact energy over a large area of the curtain.

Referring to FIG. 3, the inflatable curtain 14 includes a main portion 80, a shield portion 100, and a neck portion 120 that connects the main portion and shield portion. The main portion 80 includes the inflatable volume 60 of the curtain 14. When the inflatable curtain 14 is initially constructed or woven, the shield portion 100 is positioned outside the inflatable volume 60, in fluid communication with the inflatable volume via the neck portion 120. In a finished condition of the inflatable curtain 14 shown in FIG. 4, the shield portion 100 is turned inside-out or turned in through the neck portion 120 and positioned in the inflatable volume 60 of the curtain. This may be achieved, for example, by using a push stick (not shown) to push the shield portion into the main portion 80. As a result, the neck portion 120 is doubled over, forming the connection port 22 and giving the connection port a double-layered configuration. A terminal end fold 112 is formed where the shield portion 100 is turned inside-out into the main portion 80.

The shield portion 100 defines a shield chamber 102 positioned in the inflatable volume 60 of the inflatable curtain 14. The shield chamber 102 is in fluid communication with the connection port 22. The shield portion 100 includes a side wall 104 defined by a portion of the single layers 46 that extends along the outer edge of the inflatable curtain 14. The side wall 104 includes an end wall 106 positioned opposite the connection port 22. The end wall 106 includes one or more tear seams 110.

Figure 4:
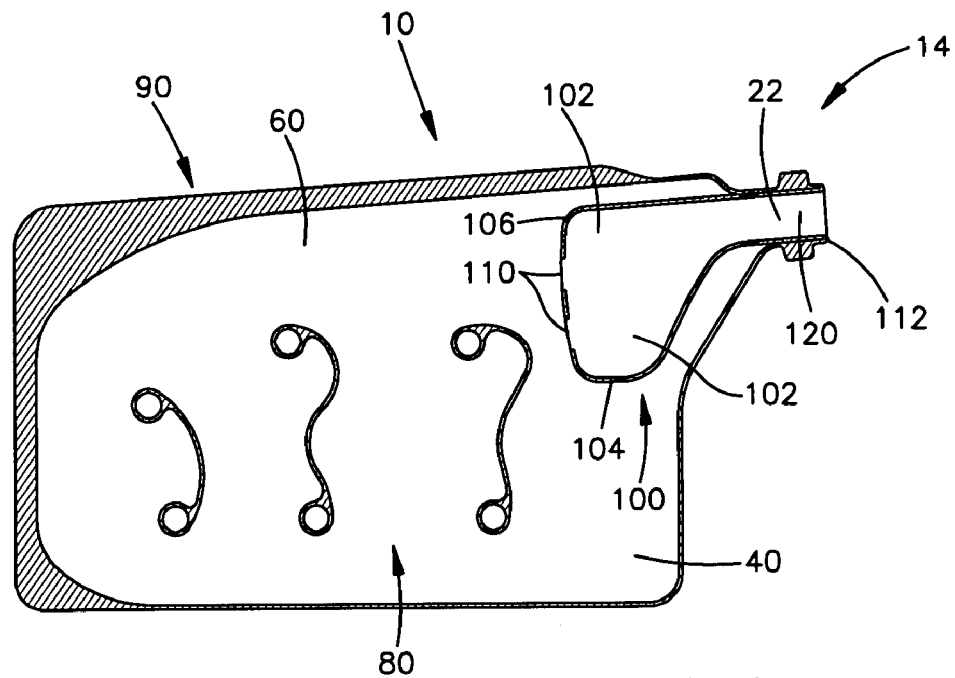
FIG. 4 is a sectional view illustrating the portion of the apparatus of FIG. 3 in a condition ready for assembly.
Figure 5:
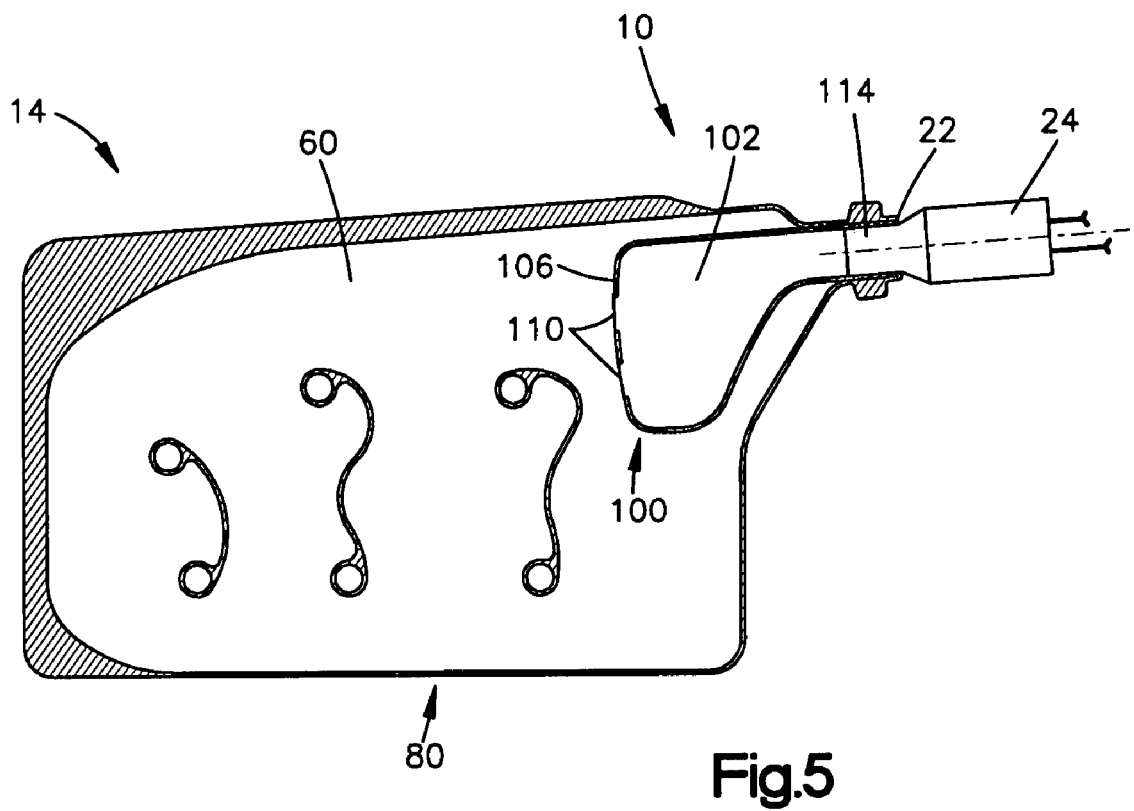
FIG. 5 is a sectional view illustrating the apparatus in an assembled condition.

FIG. 5 illustrates the inflatable curtain 14 of FIG. 4 assembled with the inflator 24. In this assembled condition, an outlet portion 114 of the inflator 24 is positioned in the connection port 22. Means (not shown), such as a clamp, secures the connection port 22 to the outlet portion 114.

Figure 6:
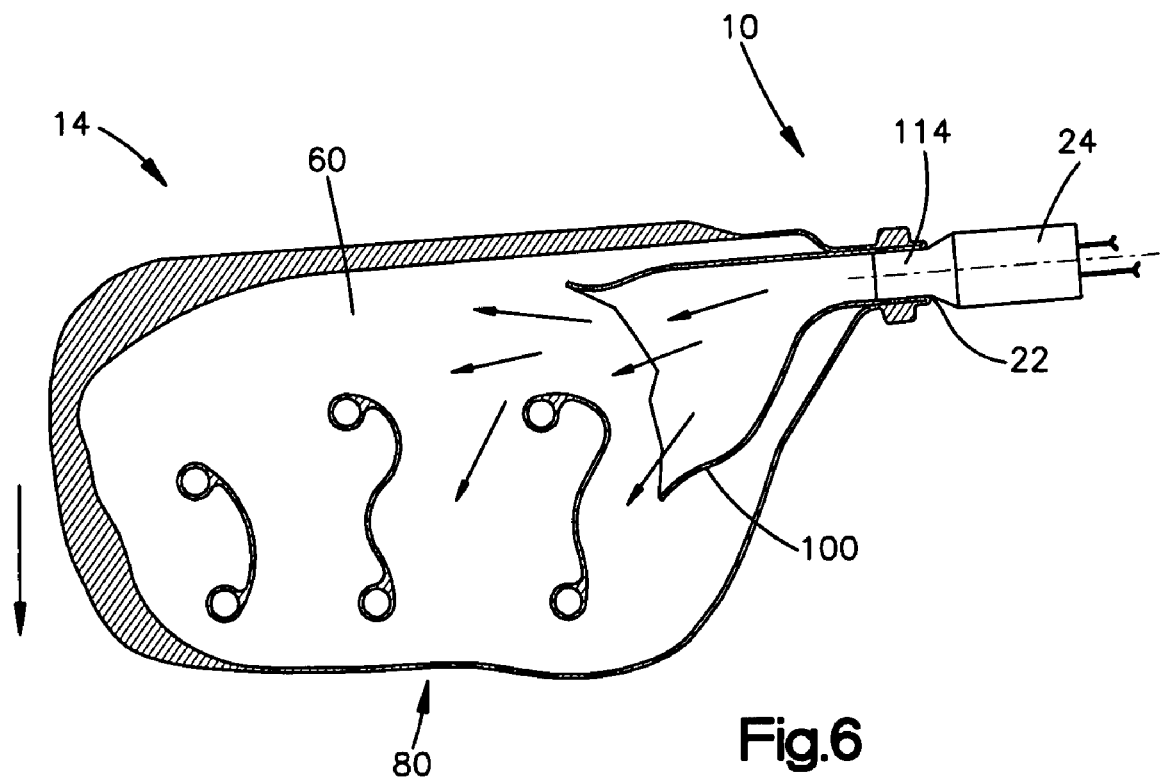
FIG. 6 is a sectional view illustrating actuation of the apparatus of FIG. 5.

The inflator 24, when actuated, discharges inflation fluid from the outlet portion 114 into the shield chamber 102 via the connection port 22. The shield portion 100 inflates and pressurizes. When a predetermined force is applied to the tear seams 110, e.g., through pressurization of the shield chamber 102, through the force of inflation fluid directed against the tear seams, or both, the tear seams rupture. This is shown in FIG. 6. When the tear seams 110 rupture, inflation fluid is directed into the inflatable volume 60 of the inflatable curtain 14 and the curtain inflates and deploys as described above.

It will thus be appreciated that the shield portion 100 bears the forces generated when the inflator 24 initially discharges inflation fluid into the inflatable curtain. The breaking or tear strength of the tear seams 110 is tailored such that the shield portion 100 does not substantially inhibit inflation and deployment of the inflatable curtain 14. Advantageously, because the shield portion 100 is turned inside-out into the main portion 80, the surface treatments (e.g., coatings or laminates) are presented toward the inflator 24 and directly receive inflation fluid flow from the inflator.

A second embodiment of the present invention is illustrated in FIGS. 7-10. The second embodiment of the invention is similar to the first embodiment of the invention illustrated in FIGS. 1-6. Accordingly, numerals similar to those of FIGS. 1-6 will be utilized in FIGS. 7-10 to identify similar components, the suffix letter "a" being associated with the numerals of FIGS. 7-10 to avoid confusion.

The apparatus 10a of FIGS. 7-10 is similar to the apparatus of FIGS. 1-6. In the embodiment illustrated in FIGS. 7-10, the apparatus 10a includes an inflatable curtain 14a configured to extend from adjacent or near the A pillar 30 (see FIGS. 1 and 2) to adjacent or near the C pillar 34 to help protect the first and second row occupants 38.

Figure 7:
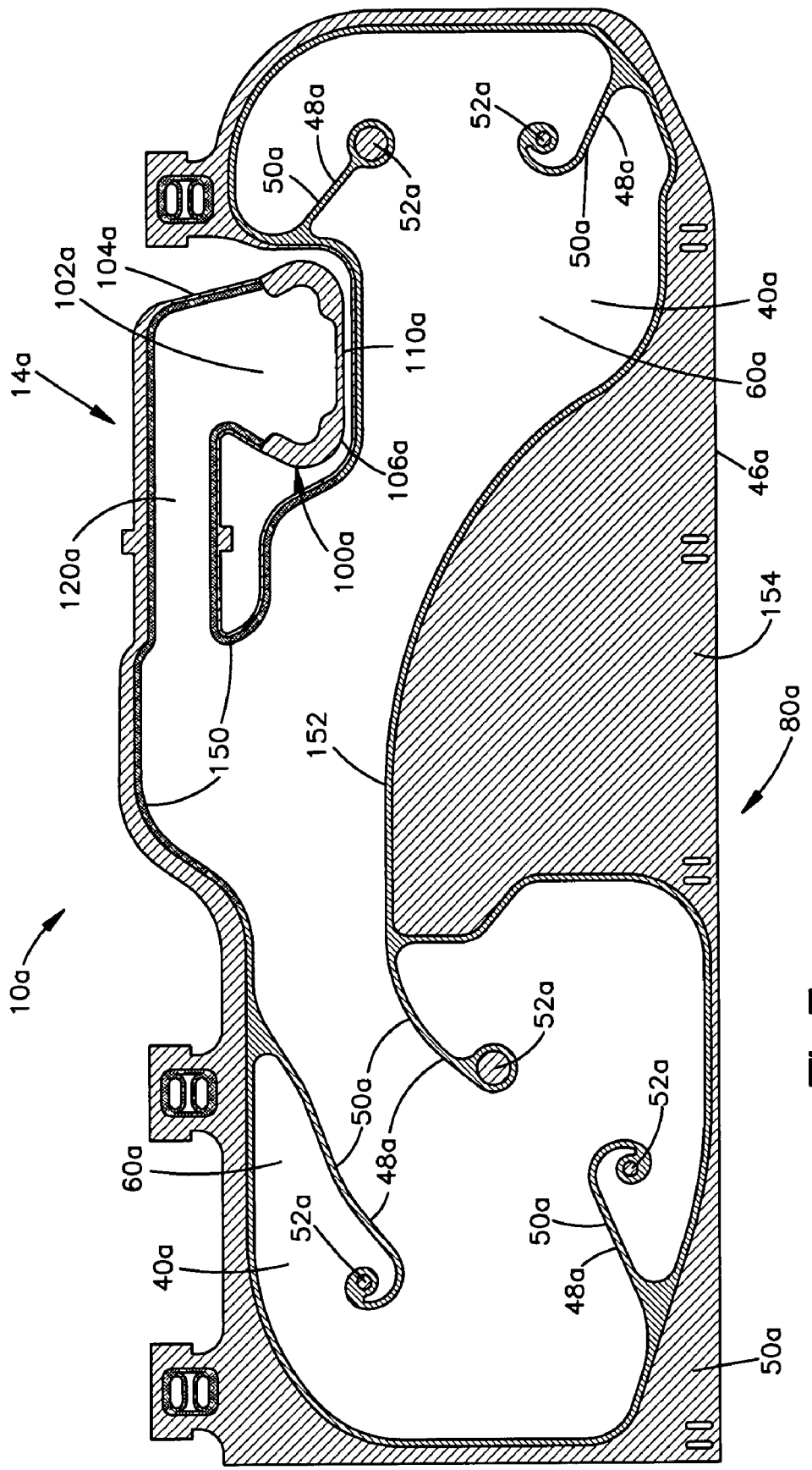
FIG. 7 is a plan view illustrating a portion of an apparatus for helping protect an occupant of a vehicle in a pre-assembled condition, according to a second embodiment of the invention.

Referring to FIGS. 7-10, the inflatable curtain 14a has a one piece woven (OPW) construction. This construction may be achieved using known weaving processes on known weaving machines, such as a Jacquard loom. Referring to FIG. 7, the OPW inflatable curtain 14a comprises (a) overlying panels 40a woven as separate layers of material and (b) single layers of material 50a that define the periphery of the overlying panels. The single layers 50a include a single layer 46a that extends along at least a portion of an outer edge of the inflatable curtain 14a. The single layers 50a may also include single layers 48a spaced from the outer edge of the inflatable curtain 14a.

The single layers 50a may be woven in any suitable weave pattern, density, or configuration. For example, in the embodiment illustrated in FIGS. 7-10, cross-hatching is used to identify areas of the inflatable curtain where different weave patterns may be used. Those skilled in the art, however, will appreciate that the inflatable curtain 14a may incorporate weave patterns different than those illustrated in FIGS. 7-10. In the example of FIGS. 7-10, the weave pattern of the cross-hatching identified at 150 may be a high-stress weave pattern, such as a 3×3 basket weave. As another example, the weave pattern of the cross-hatching identified at 152 may be a high strength weave pattern. As a further example, the weave pattern of the cross-hatching identified at 154 may be a low stress weave pattern.

The single layers 50a help define an inflatable volume 60a of the inflatable curtains 14a. The single layers 50a may also help define inflatable chambers within the inflatable volume 60a. The single layers 48a may also form non-inflatable portions of the inflatable curtain 14 positioned within the inflatable volume 60a. For example, in the embodiment illustrated in FIG. 3, the single layers 48a help define non-inflatable portions 52a of the inflatable curtain 14a.

The low stress weave 154 that forms the single layer 46a that extends along the outer edge of the inflatable curtain 14a is isolated from the inflatable volume by the high stress weave 150 and the high strength weave 152. The low stress weave of is peripheral single layer 46a thus is not exposed directly to the forces and stress created by inflation of the inflatable volume 60a.

The inflatable curtain 14a may be woven from any desired material, such as nylon yarn. The inflatable curtain 14a may be uncoated, coated with a material, such as a gas impermeable urethane, or laminated with a material, such as a gas impermeable film. The inflatable curtain 14a thus may have a gas-tight or substantially gas-tight construction. Those skilled in the art will appreciate that alternative materials, such as silicone, may also be used to coat or laminate the inflatable curtain 14a.

Referring to FIG. 7, the apparatus 10a includes an inflatable curtain 14a. The inflatable curtain 14a includes a main portion 80a, a shield portion 100a, and a neck portion 120a that connects the main portion and shield portion. The main portion 80a includes the inflatable volume 60a of the curtain 14a. When the inflatable curtain 14a is initially constructed or woven, the shield portion 100a is positioned outside the inflatable volume 60a, in fluid communication with the inflatable volume via the neck portion 120a. In a finished condition of the inflatable curtain 14a shown in FIG. 8, the shield portion 10a is turned inside-out or turned in through the neck portion 120a and positioned in the inflatable volume 60a of the curtain. This may be achieved, for example, by using a push stick (not shown) to push the shield portion into the main portion 80a. As a result, the neck portion 120a is doubled over, forming the connection port 22a and giving the connection port a double-layered configuration. A terminal end fold 112a is formed where the shield portion 100a is turned inside-out into the main portion 80a.

The shield portion 100a defines a shield chamber 102a positioned in the inflatable volume 60a of the inflatable curtain 14a. The shield chamber 102a is in fluid communication with the connection port 22a. The shield portion 100a includes a side wall 104a defined by a portion of the single layers 46a that extends along the outer edge of the inflatable curtain 14a. The side wall 104a includes an end wall 106a.

A low stress weave 154 defines the end wall 106a of the shield portion 100a and is exposed directly to the forces and stresses created by inflation fluid flow from the inflator 24a. The low stress weave 154 used to form the end wall 106a may be the same as that used in other locations on the inflatable curtain 14a, such as the single layer portions 46a along the periphery of the curtain. Alternatively, the low stress weave 154 used to form the end wall 106a may be different than that used in other locations on the inflatable curtain 14a. For example, the low stress weave 154 used to form the end wall 106a may be selected such that the end wall ruptures when subjected to a predetermined degree of force from inflation fluid discharged from the inflator 24a. To accomplish this, the low stress weave 154 may comprise a weave pattern in which the overlying panels are interconnected intermittently at spaced locations (e.g., by single or a few interlaced yarns) over the area of the end wall 106a. The end wall 106a is thus constructed to have a weakened connection between the overlying panels.

Figure 8:
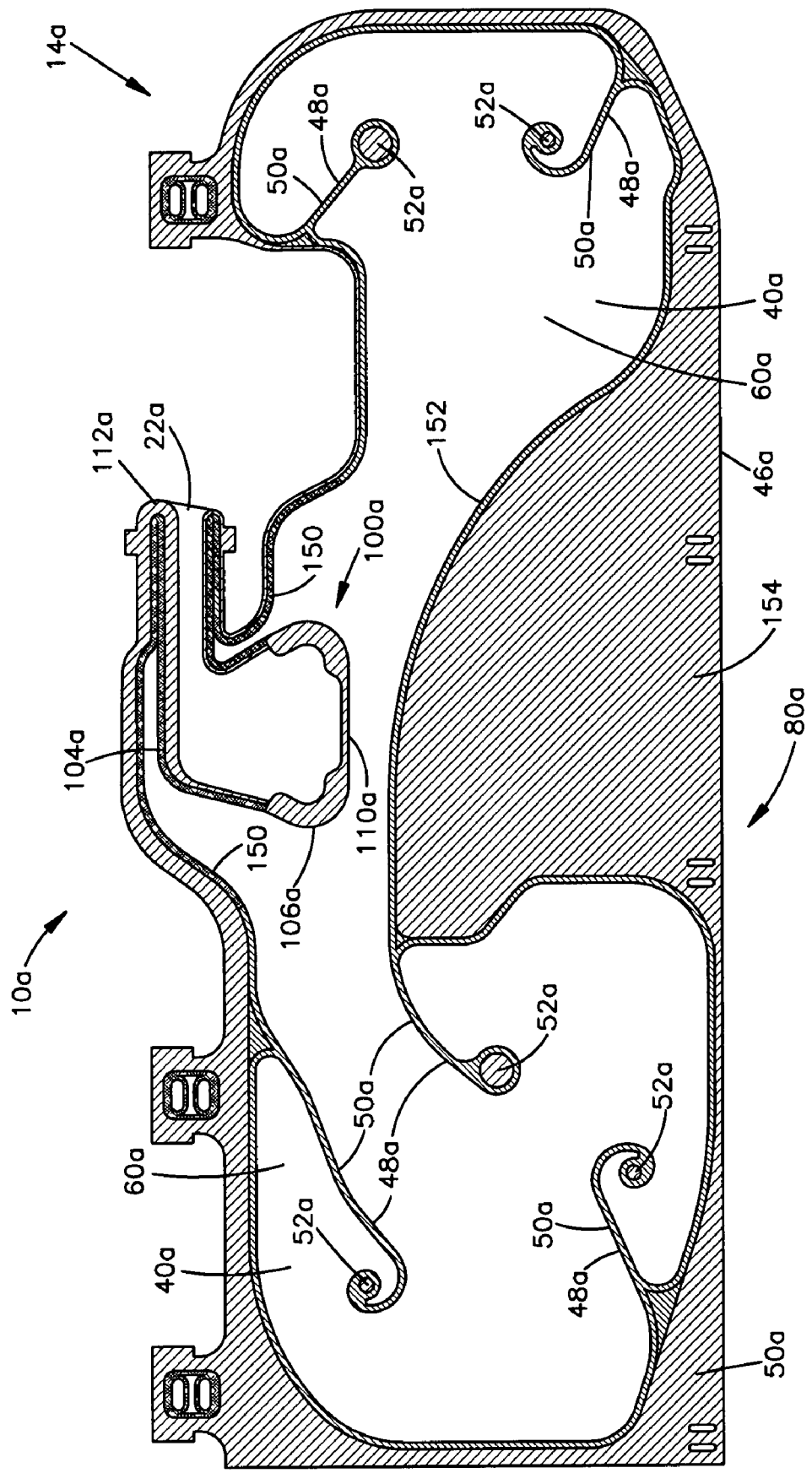
FIG. 8 is a sectional view illustrating the portion of the apparatus of FIG. 7 in a condition ready for assembly.
Figure 9:
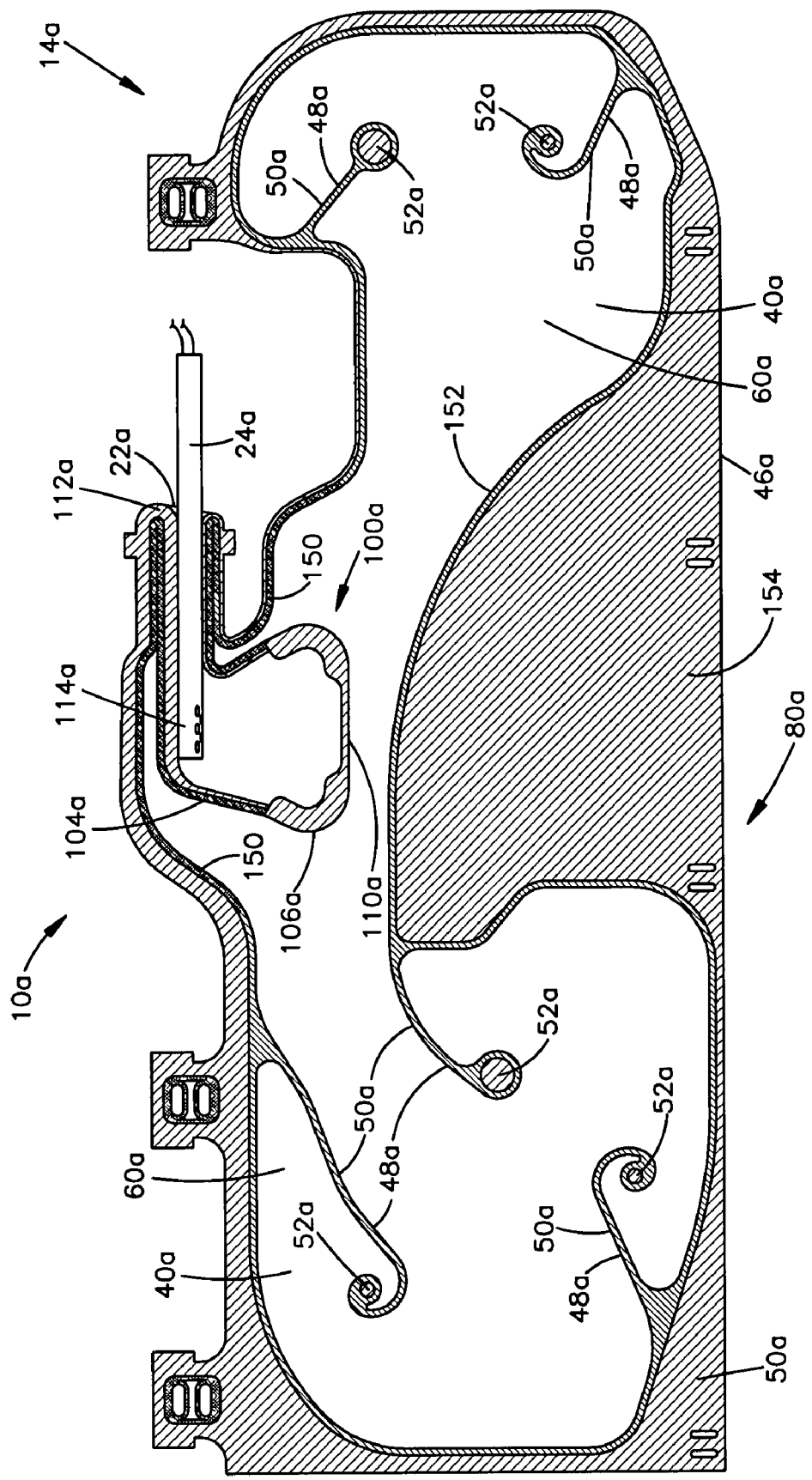
FIG. 9 is a sectional view illustrating the apparatus of FIGS. 7 and 8 in an assembled condition.

FIG. 9 illustrates the inflatable curtain 14a of FIG. 8 assembled with the inflator 24a. In this assembled condition, an outlet portion 114a of the inflator 24a is positioned in the connection port 22a. Means (not shown), such as a clamp, secures the connection port 22a to the outlet portion 114a.

Figure 10:
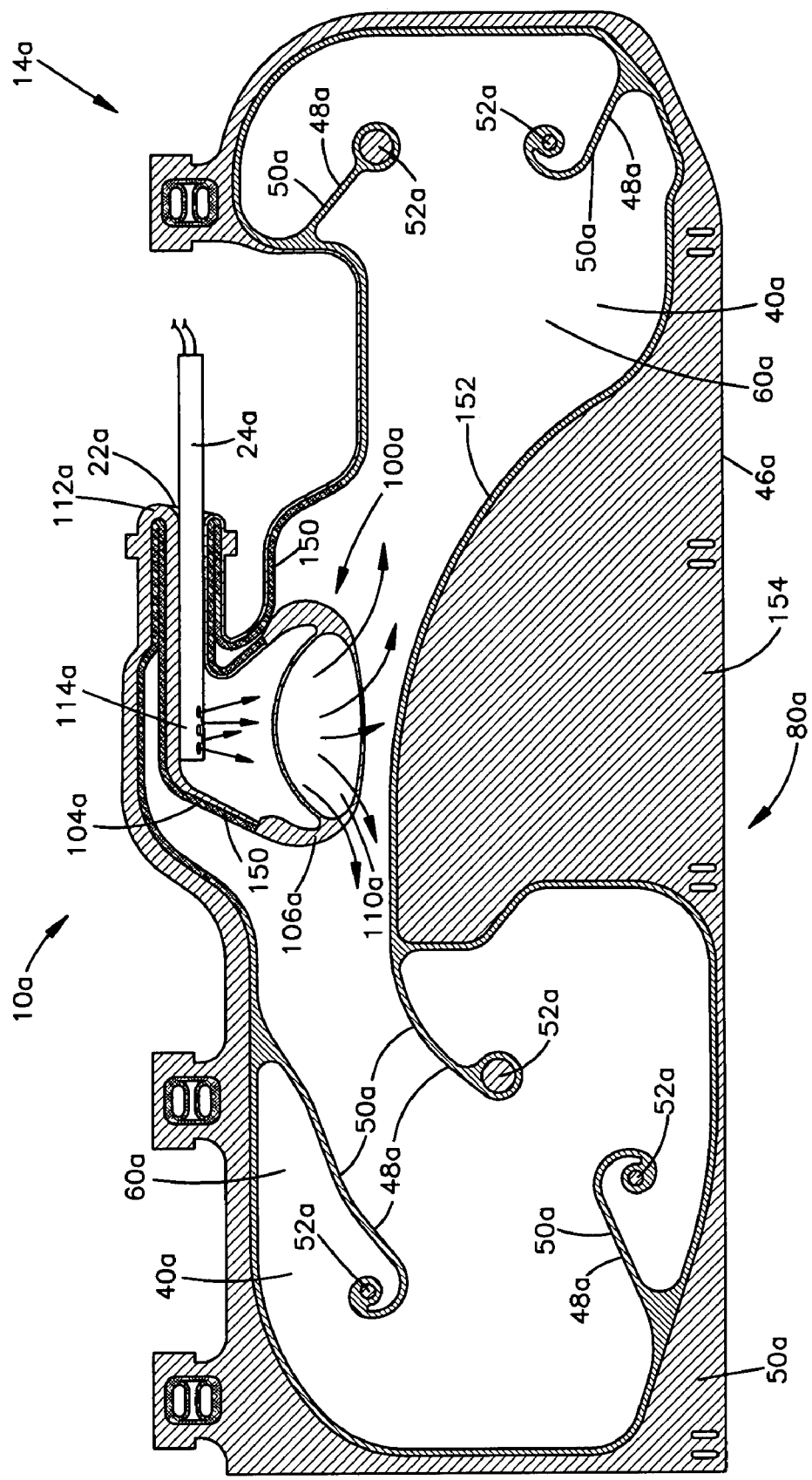
FIG. 10 is a sectional view illustrating actuation of the apparatus of FIG. 9.

The inflator 24a, when actuated, discharges inflation fluid from the outlet portion 114a into the shield chamber 102a via the connection port 22a. The shield portion 100a inflates and pressurizes. When a predetermined force is applied to the end wall 106a, e.g., through pressurization of the shield chamber 102a, through the force of inflation fluid directed against the low stress weave 154 of the end wall, or both, the end wall 106a ruptures. This is shown in FIG. 10. When the end wall 106a ruptures, inflation fluid is directed into the inflatable volume 60a of the inflatable curtain 14a and the curtain inflates and deploys as described above.

It will thus be appreciated that the shield portion 100a bears the forces generated when the inflator 24a initially discharges inflation fluid into the inflatable curtain. The breaking or tear strength of the low stress weave 154 of the end wall 106a is tailored such that the shield portion 10a does not substantially inhibit inflation and deployment of the inflatable curtain 14a. Advantageously, because the shield portion 100a is turned inside-out into the main portion 80a, the surface treatments (e.g., coatings or laminates) are presented toward the inflator 24a and directly receive inflation fluid flow from the inflator.

From the above description of the invention, those skilled in the art will perceive improvements, changes and modifications. For example, the shield portion construction of the present invention may be implemented in protection devices other than inflatable curtains, such as driver frontal air bags, passenger frontal air bags, side air bags, and inflatable knee bolsters. Such improvements, changes and modifications within the skill of the art are intended to be covered by the appended claims.

Having described the invention, the following is claimed:

1. An inflatable vehicle occupant protection device comprising:
   a main portion defining an inflatable volume;
   a shield portion defining a shield chamber; and
   a neck portion that interconnects the main portion and shield portion, the neck portion providing fluid communication between the inflatable volume and shield chamber;
   the shield portion being turned inside-out through the neck portion and positioned in the inflatable volume, the neck portion being doubled over and turned-in to define a double-layered connection port into which an inflation fluid source is insertable to deliver inflation fluid into the shield portion, the shield portion being configured to receive inflation fluid from the inflation fluid source, the shield portion being further configured to rupture and release inflation fluid into the inflatable volume of the main portion.

2. The inflatable vehicle occupant protection device recited in claim 1, wherein the protection device has a one piece woven construction in which the main portion and shield portion are woven as a single piece of material.

3. The inflatable vehicle occupant protection device recited in claim 1, wherein the shield chamber receives inflation fluid initially directed into the protection device.

4. The inflatable vehicle occupant protection device recited in claim 1, wherein the shield portion comprises tear seams rupturable in response to inflation fluid directed into the shield chamber.

5. The inflatable vehicle occupant protection device recited in claim 1, wherein the shield portion comprises a portion constructed of a low stress weave rupturable in response to inflation fluid directed into the shield chamber.

6. The inflatable vehicle occupant protection device recited in claim 5, wherein the low stress weave comprises portions of the overlying panels in which yarns of the panels are interlaced intermittently at locations spaced about an area that the low stress weave covers.

7. The inflatable vehicle occupant protection device recited in claim 1, further comprising a surface treatment applied on an outer surface of the protection device, the surface treatment covering an inner surface of the shield portion when the shield portion is turned-out and positioned in the main portion.

8. The inflatable vehicle occupant protection device recited in claim 1, wherein the main portion and shield portion define a single closed volume prior to the shield portion being turned inside-out into the main portion.

9. The inflatable vehicle occupant protection device recited in claim 1, wherein the protection device comprises an inflatable curtain inflatable away from a roof of a vehicle between a side structure of the vehicle and a vehicle occupant.

10. the inflatable vehicle occupant protection device recited in claim 1, wherein the inflatable volume and shield chamber define a single closed volume that is opened through rupture of the shield portion.

11. An apparatus for helping to protect an occupant of a vehicle having a side structure and a roof, the apparatus comprising:
   an inflatable vehicle occupant protection device being inflatable away from the vehicle roof between the side structure of the vehicle and a vehicle occupant, the protection device comprising:
   a main portion an inflatable volume; and
   a shield portion defining a shield chamber, the inflatable volume and shield chamber being in fluid communication with each other and defining a single closed volume; the shield portion being turned inside-out, positioned in the inflatable volume, and configured to receive inflation fluid from an inflation fluid source, the shield portion receiving and helping to absorb forces from the initial discharge of inflation fluid into the protection device.

12. The apparatus recited in claim 11, wherein the shield portion is configured to rupture to release inflation fluid into the inflatable volume of the main portion.

13. The inflatable vehicle occupant protection device recited in claim 11, wherein the protection device has a one piece woven construction in which the main portion and shield portion are woven as a single piece of material.

14. The inflatable vehicle occupant protection device recited in claim 11, further comprising a connection port for receiving inflation fluid for inflating the protection device, the connection port being where the shield portion is turned inside-out into the main portion.

15. The inflatable vehicle occupant protection device recited in claim 14, further comprising an inflator for providing inflation fluid for inflating the protection device, the connection port being connectable to the inflator.

16. The inflatable vehicle occupant protection device recited in claim 11, wherein the shield portion comprises tear seams rupturable in response to inflation fluid directed into the shield chamber.

17. The inflatable vehicle occupant protection device recited in claim 11, wherein the shield portion comprises a portion constructed of a low stress weave rupturable in response to inflation fluid directed into the shield chamber.

18. The inflatable vehicle occupant protection device recited in claim 17, wherein the low stress weave comprises portions of the overlying panels in which yarns of the panels are interlaced intermittently at locations spaced about an area that the low stress weave covers.

19. The inflatable vehicle occupant protection device recited in claim 11, further comprising a surface treatment applied on an outer surface of the protection device, the surface treatment covering an inner surface of the shield portion when the shield portion is turned inside-out and positioned in the main portion.

20. A one piece woven inflatable vehicle occupant protection device comprising:
   a main portion defining an inflatable volume;
   a shield portion defining a shield chamber; and
   a neck portion providing fluid communication between the inflatable volume and the shield chamber;
   the shield portion being turned inside-out through the neck portion and positioned in the inflatable volume, and the neck portion being doubled over and turned-in to define a double-layered connection port into which an inflation fluid source is insertable to deliver inflation fluid into the shield portion, the shield portion being configured to receive inflation fluid from the inflation fluid source and being further configured to rupture and release inflation fluid into the inflatable volume of the main portion.

* * * * *